United States Patent
Glueckler (10) Patent No.: US 12,042,967 B2
(45) Date of Patent: Jul. 23, 2024

(54) SUPPLY DEVICE FOR SUPPLYING PASTY MASSES

(71) Applicant: Kloeckner Desma Elastomertechnik GmbH, Fridingen (DE)

(72) Inventor: Raphael Glueckler, Baerenthal (DE)

(73) Assignee: Kloeckner Desma Elastomertechnik GmbH, Fridingen (DE)

( * ) Notice: Subject to any disclaimer, the term of this patent is extended or adjusted under 35 U.S.C. 154(b) by 0 days.

(21) Appl. No.: 16/635,606

(22) PCT Filed: Aug. 3, 2018

(86) PCT No.: PCT/EP2018/071182
§ 371 (c)(1),
(2) Date: Jan. 31, 2020

(87) PCT Pub. No.: WO2019/025612
PCT Pub. Date: Feb. 7, 2019

(65) Prior Publication Data
US 2020/0238583 A1  Jul. 30, 2020

(30) Foreign Application Priority Data

Aug. 3, 2017  (DE) ............... 10 2017 117 622.5

(51) Int. Cl.
*B29C 45/18* (2006.01)
*B29C 31/06* (2006.01)
(Continued)

(52) U.S. Cl.
CPC .......... *B29C 45/1808* (2013.01); *B29C 31/06* (2013.01); *B29C 2043/3444* (2013.01);
(Continued)

(58) Field of Classification Search
CPC .................. B29C 2043/3444; B29C 31/06
(Continued)

(56) References Cited

U.S. PATENT DOCUMENTS 2,338,607 A    1/1944  Wacker
3,855,381 A *  12/1974 Eckstein ............... B29C 55/30
                                              264/138
(Continued)

FOREIGN PATENT DOCUMENTS

EP    0 995 572 A1    4/2000
EP    1 777 060 A1    4/2007
(Continued)

OTHER PUBLICATIONS

International Search Report in PCT/EP2018/071182, dated Dec. 17, 2018.
(Continued)

*Primary Examiner* — Jacob T Minskey
*Assistant Examiner* — Wayne K. Swier
(74) *Attorney, Agent, or Firm* — Collard & Roe, P.C.

(57) ABSTRACT

The invention relates to a feeding apparatus for feeding pasty masses, in particular silicone, to an injection molding machine, having a pressing cylinder which receives the pasty mass, and a pressing plunger which is arranged axially in said pressing cylinder and presses the pasty mass out of a squeezing nozzle of the pressing cylinder. It is an object of the invention to avoid operational interruptions for cleaning work in the case of a feeding apparatus of this type and to avoid material losses within the feeding apparatus in the case of the successive use of different pasty masses. In order to achieve said object, the invention proposes that the pressing cylinder is configured as a cartridge (3) which contains the pasty mass, consists of a polymer, and can be inserted exchangeably into a supporting housing (2) which supports the cartridge on all sides and is connected to an axial actuating drive (5) for the pressing plunger (3*d*) which is situated in the cartridge.

7 Claims, 5 Drawing Sheets

(51) Int. Cl.
  *B29C 43/34* (2006.01)
  *B29C 45/76* (2006.01)
  *B29C 67/24* (2006.01)
  *B29K 83/00* (2006.01)

(52) U.S. Cl.
  CPC .............. *B29C 45/76* (2013.01); *B29C 67/24* (2013.01); *B29K 2083/005* (2013.01)

(58) Field of Classification Search
  USPC ........................................................ 425/132
  See application file for complete search history.

(56) References Cited

U.S. PATENT DOCUMENTS

| | | | | |
|---|---|---|---|---|
| 6,059,559 | A | * | 5/2000 | Doweidt ................ B29C 31/06 425/585 |
| 6,689,303 | B2 | | 2/2004 | Seki et al. |
| 2004/0058032 | A1 | * | 3/2004 | Felix ....................... B29C 45/68 425/595 |
| 2007/0088288 | A1 | * | 4/2007 | Barron .............. A61M 5/31541 604/207 |
| 2013/0175732 | A1 | * | 7/2013 | Lust ................... B29C 45/2673 425/542 |
| 2014/0117571 | A1 | * | 5/2014 | Howe ................ B29C 45/1753 264/39 |
| 2014/0180218 | A1 | * | 6/2014 | Fourt .................. A61M 5/2033 604/220 |

FOREIGN PATENT DOCUMENTS

| | | |
|---|---|---|
| FR | 2 495 052 A1 | 6/1982 |
| JP | H11-34107 A | 2/1999 |
| WO | 2013/123099 A1 | 8/2013 |

OTHER PUBLICATIONS

"LSR (Liquid Silicone Rubber)—babyplast", (Sep. 7, 2009), pp. 1-2, Retrieved from the Internet: http://www.ft.sg/pdf/B aby Plast%20LSR.pdf [retrieved on Dec. 6, 2018] XP055530864.

"LSR-Baukasten für babyplast", (Oct. 11, 2012), pp. 1-2, Retrieved from the Internet: https ://www.kunststoffe.de/produkte/uebersicht/beitrag/lsr -baukasten-fuer -babyplast-mikrospritzgiessen-mit-lsr—566965.html, [retrieved on Dec. 6, 2018] XP055530841.

Brown Anita Jul et al. "LSR injection molding equipment built specifically for micro sized applications", (Jun. 2001), pp. 1-3, Retrieved from the Internet: http://www.accessmylibrary.com/coms2/ summary_0286-10418164_ITM [retrieved on Dec. 8, 2006] XP002410879.

Bob Pelletier, "LSR Part III—Choosing a Mixing/Metering System" (Aug. 23, 2011), pp. 1-5, Retrieved from the Internet: https://www.ptonline.com/blog/post/getting-into-lsr -part-iii—choosing-a-mixingmetering-system [retrieved on Dec. 5, 2018] XP055530572.

"LSR-Spritzeinheit" (Jun. 19, 2008), pp. 1-2, Retrieved from the Internet: http://www.retechgmbh.ch/SimpleContentManager/plugins/Filemanager/Files/LSR_Spritzeinheit.pdf?PHPSES SID= 432290ed9c79b476c89 1e57 dfac89 | 92 [retrieved on Dec. 4, 2018] XP055530159.

* cited by examiner

SUPPLY DEVICE FOR SUPPLYING PASTY MASSES

CROSS REFERENCE TO RELATED APPLICATIONS

This application is the National Stage of PCT/EP2018/071182 filed on Aug. 3, 2018, which claims priority under 35 U.S.C. § 119 of German Application No. 10 2017 117 622.5 filed on Aug. 3, 2017, the disclosure of which is incorporated by reference. The international application under PCT article 21(2) was not published in English.

The invention relates to a feeding apparatus for feeding pasty masses, in particular silicone, to an injection molding machine, having a pressing cylinder which receives the pasty mass, and a pressing plunger which is arranged axially in said pressing cylinder and presses the pasty mass out of a squeezing nozzle of the pressing cylinder.

Feeding apparatuses of this type are known and are used primarily on industrial injection molding machines. Injection molded parts for a very wide variety of applications are produced by way of injection molding machines of this type.

In the case of the use of the feeding apparatuses in accordance with the prior art, the pasty mass which is usually supplied in block form or in an amorphous state, for example silicone, is stuffed into the pressing cylinder, is subsequently compressed by way of the pressing plunger which can be pushed into the pressing cylinder, and is then pressed out of the pressing cylinder via the squeezing nozzle at high pressure. On account of this procedure, apparatuses of this type are also called silicone stuffers commercially.

The feeding apparatuses which are known in accordance with the prior art are problematic in many respects. Since the pressures which are required for pressing out the pasty mass are comparatively great and can be more than 70 bar, the pressing cylinder has to be correspondingly robust and accordingly consists, just like the pressing plunger, of a high strength, metallic material. Moreover, the sealing means between the pressing cylinder and the pressing plunger has to be tight, durable and correspondingly wear-resistant. In order to reduce the viscosity of the pasty mass, it is often necessary, moreover, for the pressing cylinder to be of heatable configuration. A further problem consists in that, in the case of the filling of the pressing cylinder, air often unintentionally passes into the interior space of the pressing cylinder, which air has to be removed laboriously, because it impedes the pressing operation or can have negative effects on the pasty mass. Furthermore, difficulties arise if different pasty masses are to be used successively, for example masses with a different color or a different consistency. In this case, the pressing cylinder has to be emptied and cleaned laboriously in each case, in order that undesired mixing of the different pasty masses does not occur. Therefore, almost every change of the pasty mass to be used leads to a considerable material loss in the region of the feeding apparatus.

All of the abovementioned problems lead firstly to undesired operational interruptions of the injection molding machine and secondly to material losses. It is therefore an object of the invention to develop the feeding apparatus of the type mentioned at the outset, in such a way that undesired operational interruptions of the injection molding machine are avoided and a successive use of different pasty masses can be avoided without material losses within the feeding apparatus.

In order to achieve said object, proceeding from a feeding device of the type mentioned at the outset, the invention proposes that the pressing cylinder is configured as a cartridge which contains the pasty mass, consists of a polymer, and can be inserted exchangeably into a supporting housing which supports the cartridge on all sides and is connected to an axial actuating drive for the pressing plunger which is situated in the cartridge.

Although, in accordance with the prior art, cartridges which are produced from polymer and are filled with silicone or a comparable pasty mass have been known for a long time, for example, for use in the building trade, the use of cartridges of this type in a feeding apparatus for an injection molding machine was not possible in accordance with the prior art, however, because a cartridge of this type which is produced from polymer would on no account have withstood the pressures which occur there. Only the arrangement proposed according to the invention of the exchangeable cartridge in a supporting housing which supports the cartridge on all sides and is connected to an actuating drive for the pressing plunger which is situated in the cartridge makes the use of cartridges of this type in a feeding apparatus of the generic type according to the invention possible.

Because the cartridge is exchanged regularly, excessive wear between the pressing plunger and the pressing cylinder (here, cartridge) no longer has to be feared. Furthermore, it is possible to already bring the content of the cartridge to the required temperature before the insertion into the supporting housing, with the result that the pasty mass always immediately has the required flowability. Direct heating of the feeding apparatus is therefore superfluous. Since the cartridge is filled completely with the pasty mass, ventilating before the beginning of the feeding operation is superfluous. If the cartridge is empty or a different pasty mass is required for the next injection molded part or the next injection molded series, the cartridge can be exchanged rapidly and easily. The supporting housing per se does not come into contact with the pasty mass in the case of the feeding operation, with the result that no more cleaning work is necessary in the region of the feeding apparatus. Should there be a residue of pasty mass which can still be used in the cartridge which has been previously used, said cartridge can be stored and can be reused at a later time.

One preferred embodiment of the invention provides that the supporting housing is of modular configuration and has two half shells which support the casing of the cartridge and are connected to one another such that they can be folded open laterally and are articulated about a swivel axis which runs parallel to the longitudinal axis of the cartridge, the receiving space for the cartridge, which receiving space is enclosed by the half shells, being delimited axially at the front and at the rear by closure plates, of which the front closure plate is provided with a passage opening for the squeezing nozzle of the cartridge, whereas the rear closure plate is provided with a passage opening for a push rod of the axial actuating drive, which push rod acts on the pressing plunger of the cartridge.

Said modular construction of the supporting housing firstly makes rapid exchanging of the cartridges possible, and secondly ensures the required all-round and tight support of the cartridge which is produced from a polymer and would not be sufficiently pressure-resistant without a support of this type.

Furthermore, it is provided that the supporting housing has a rigid, outer supporting cage which is formed by the front closure plate, at least two tie rods which run parallel to the longitudinal axis of the cartridge and are arranged outside the half shells, and an abutment frame which runs parallel to the closure plates and to which the actuating drive which displaces the push rod is fastened on the side which faces away from the supporting housing. As a result of the use of a supporting cage of this type, the modules of the supporting housing can remain movable relative to one another in the case of an open supporting housing, which is necessary for the effortless insertion of the cartridge, and can be braced against one another in the case of the closing of the supporting housing, which is important with regard to the all-round supporting function of the supporting housing during the squeezing operation of the cartridge.

In order to connect the modules of the supporting housing to one another particularly fixedly in the case of a closed supporting housing, it is provided that the half shells of the supporting housing are provided with tongue/groove connections which engage axially into one another on their end sides and those faces of the closure plates which face said end sides, and that the rear closure plate can be displaced axially relative to the supporting cage or to the front closure plate which is connected rigidly to said supporting cage. Said tongue/groove connections of annular configuration form positively locking joints between the half shells and the closure plates in the case of a closed supporting housing, with the result that the supporting housing can support even very great forces which emanate from the cartridge.

It is provided for the axial displacement of the modules of the supporting housing after the insertion of the cartridge and the subsequent squeezing of the cartridge that, after the insertion of the cartridge into the supporting housing, the push rod of the axial actuating drive can be connected by means of a locking apparatus first of all only to the rear closure plate and subsequently only to the pressing plunger of the cartridge.

In order to ensure that the two half shells and the cartridge can always assume the required position axially in the case of the insertion of the cartridge and the subsequent closing of the supporting housing, it is provided, furthermore, that the lower half shell of the supporting housing is fixed in an axially non-displaceable manner on the front closure plate, and that the upper half shell of the supporting housing is mounted in an axially displaceable manner on the supporting housing cage in the case of a closed supporting housing and an inserted cartridge.

In order to ensure, furthermore, that the cartridge has the correct axial position relative to the upper half shell in the case of a closed supporting housing, the invention provides that, on its outer circumference, the cartridge is provided with a circumferential driver groove, into which a driver projection which is arranged on the inner side of the upper half shell engages in the case of the closing of the supporting housing. Furthermore, the cartridge is provided with a circumferential positioning groove, into which, in the case of an open supporting housing, a swivel plate which is assigned to the upper half shell engages. As a result, the correct axial position of the cartridge in relation to the upper half shell is already fixed in the case of the insertion of the cartridge and before the closing of the supporting housing.

In order for it to be possible for the movements of the push rod of the axial actuating drive to be measured and controlled, it is finally provided that the push rod of the axial actuating drive is assigned a distance measuring apparatus which determines the respective axial position. Said distance measuring apparatus makes it possible, in particular, for the squeezing operation of the cartridge and therefore the quantity of the squeezed pasty mass to be limited in accordance with the requirement.

One exemplary embodiment of the invention will be described in greater detail in the following text on the basis of the drawing, in which.

Figure 1:
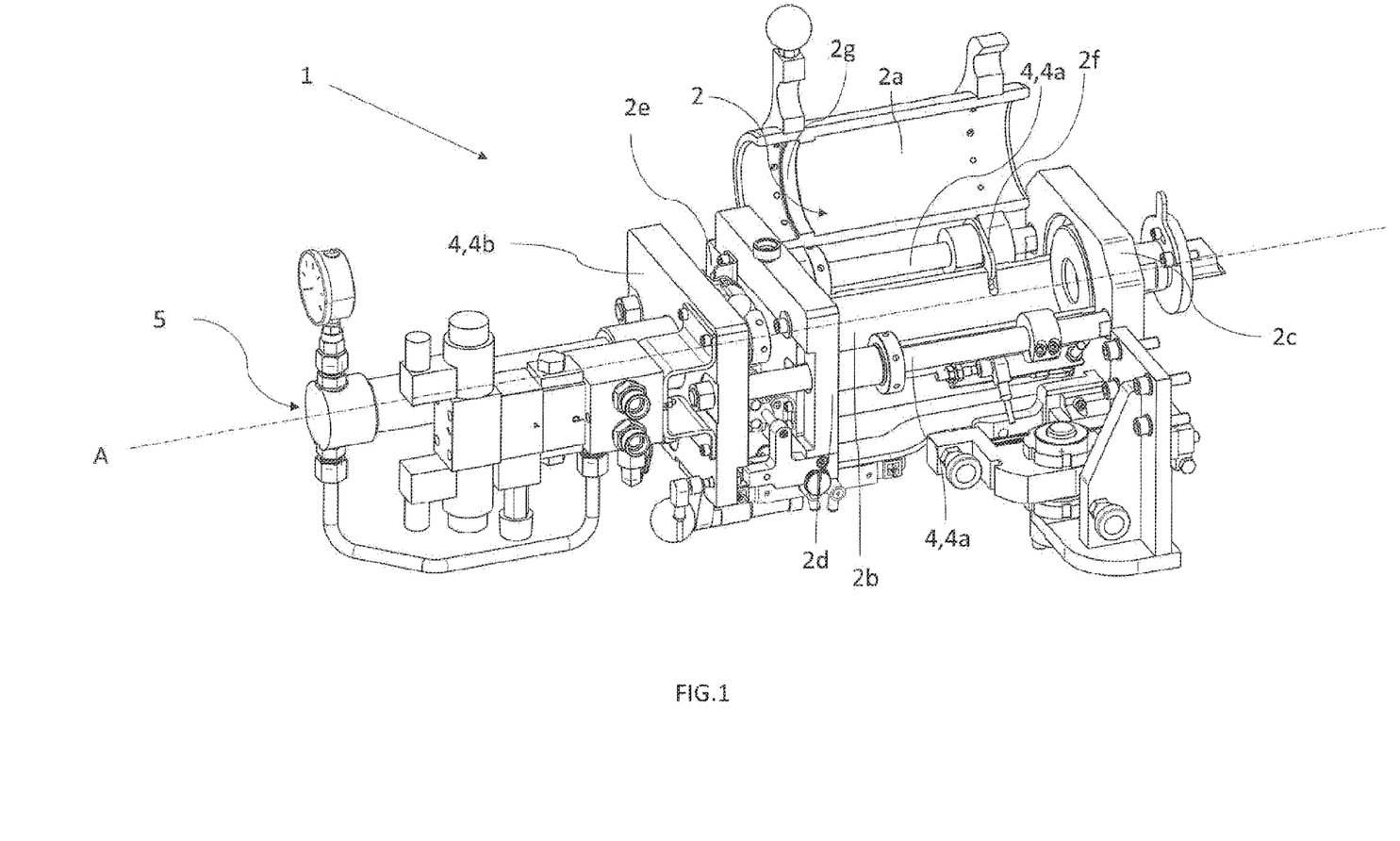
FIG. 1 diagrammatically shows a 3D view of a feeding apparatus according to the invention with an open supporting housing without a cartridge, in a first perspective, FIG. 2 diagrammatically shows a longitudinal section through a cartridge which can be used in a feeding apparatus according to the invention.

In the drawing, the feeding apparatus is denoted in its entirety by way of the designation 1. One essential constituent part of the feeding device 1 is a supporting housing 2 of modular configuration which has a lower half shell 2b, an upper half shell 2a, a front closure plate 2c and a rear closure plate 2d. The supporting housing 2 encloses a cylindrical receiving space, into which a cartridge 3 which contains the pasty mass to be fed in (see FIG. 2) can be inserted exchangeably.

Figure 2:
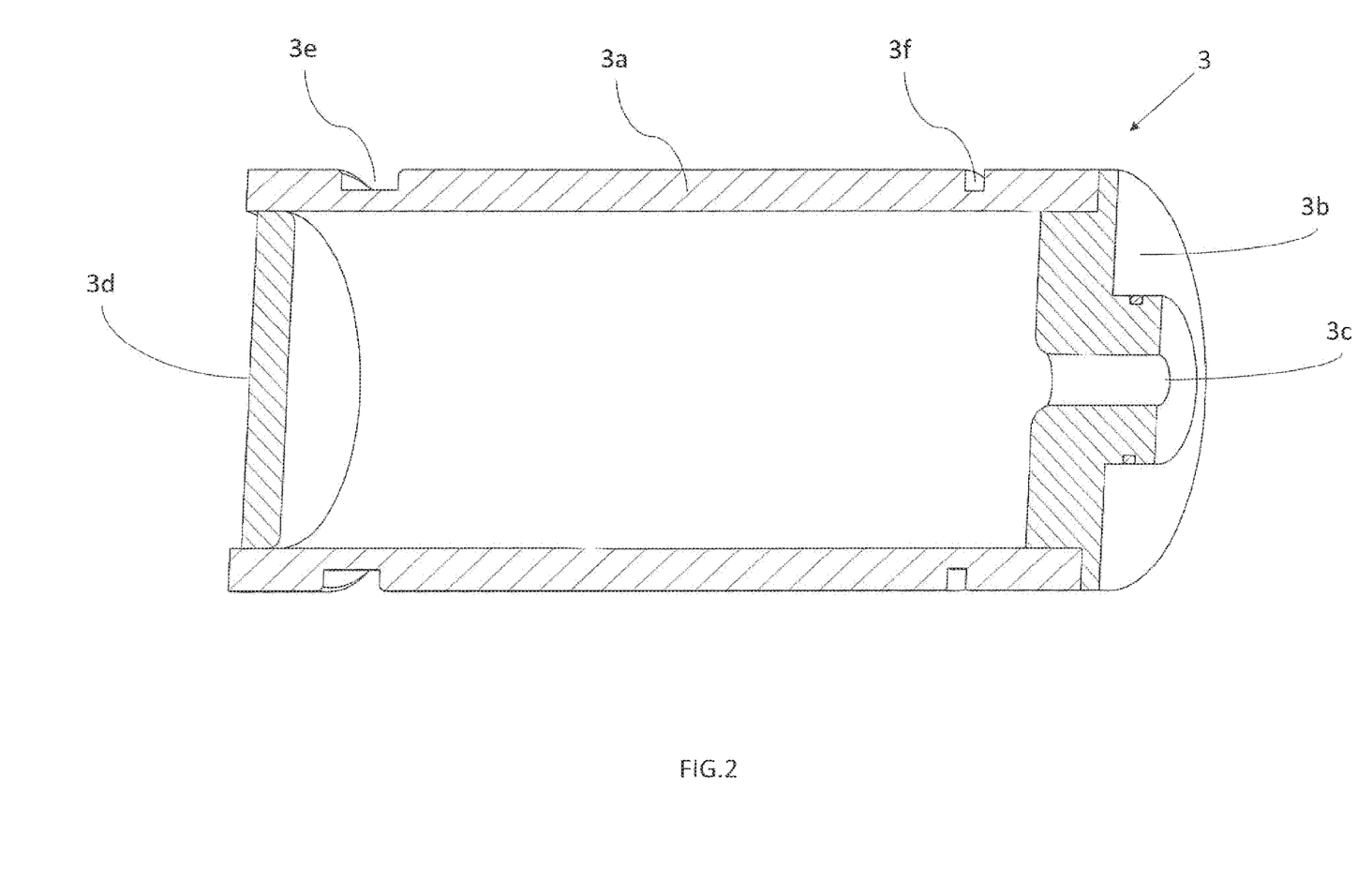

The cartridge 3 which is shown in section in FIG. 2 is produced in its entirety from a suitable polymer and has a cartridge cylinder 3a which is closed at the front by way of a closure plate 3b with a squeezing nozzle 3c, and into which cartridge cylinder 3a a pressing plunger 3d can be pushed from the rear, which pressing plunger 3d presses the pasty mass which is contained in the cartridge cylinder 3a out of the cartridge 3.

Figure 3:
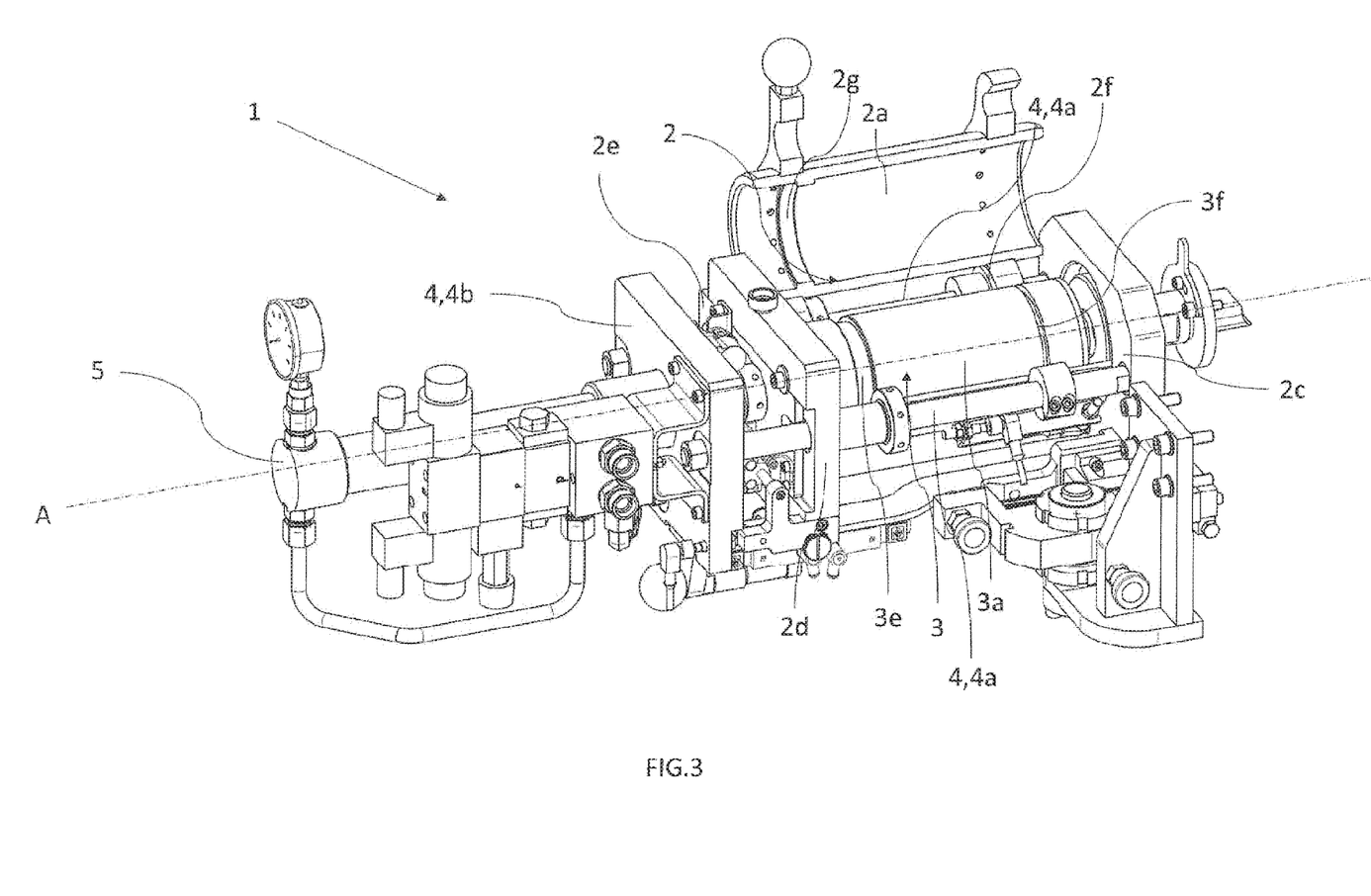
FIG. 3 shows, in an identical illustration to FIG. 1, a 3D view of the feeding apparatus with an open supporting housing and an inserted cartridge, FIG. 4 diagrammatically shows a 3D view of the feeding apparatus according to FIG. 1 in a second perspective (without the abutment frame and without the axial actuating drive) in the case of a closed, but not yet locked supporting housing.
Figure 4:
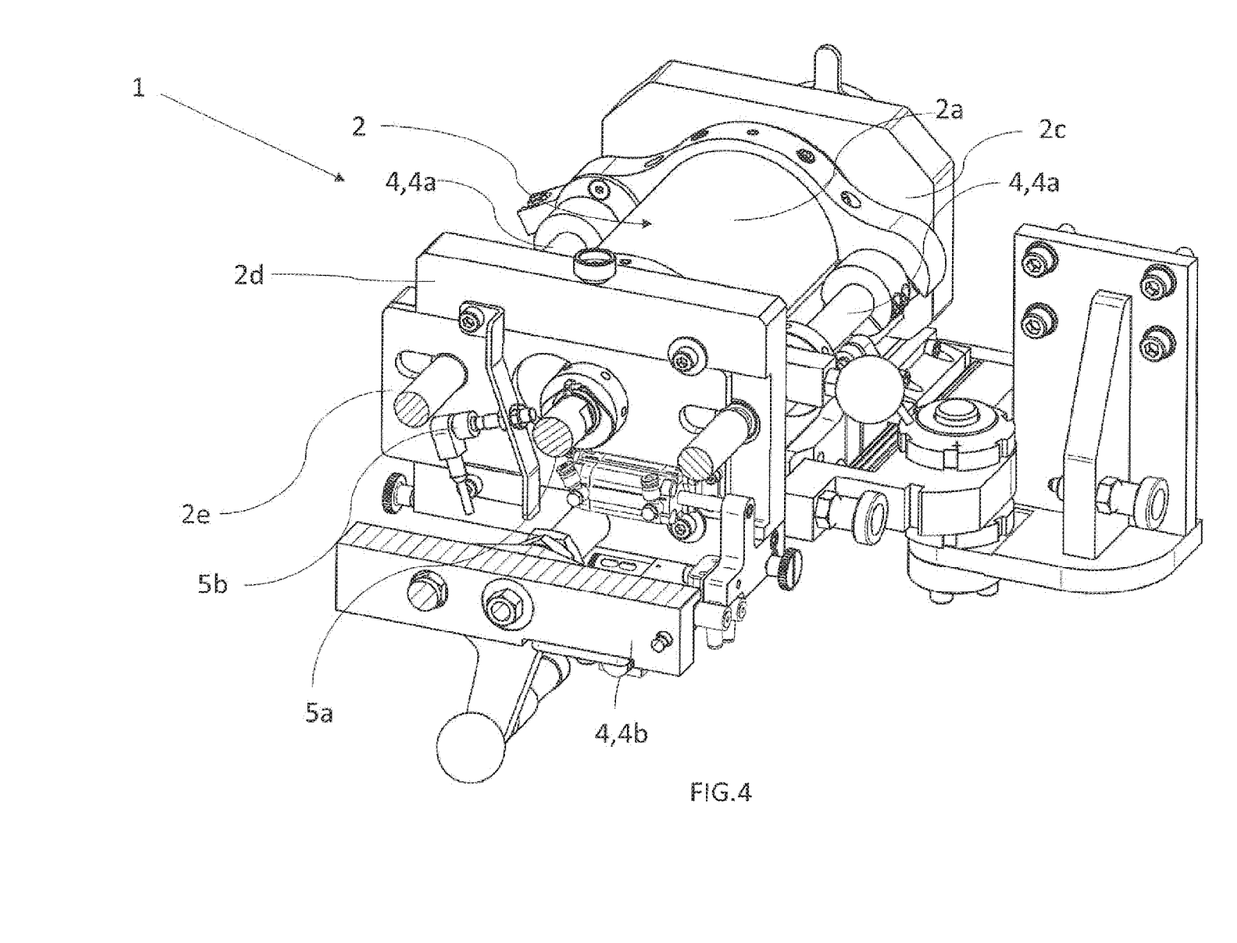
Figure 5:
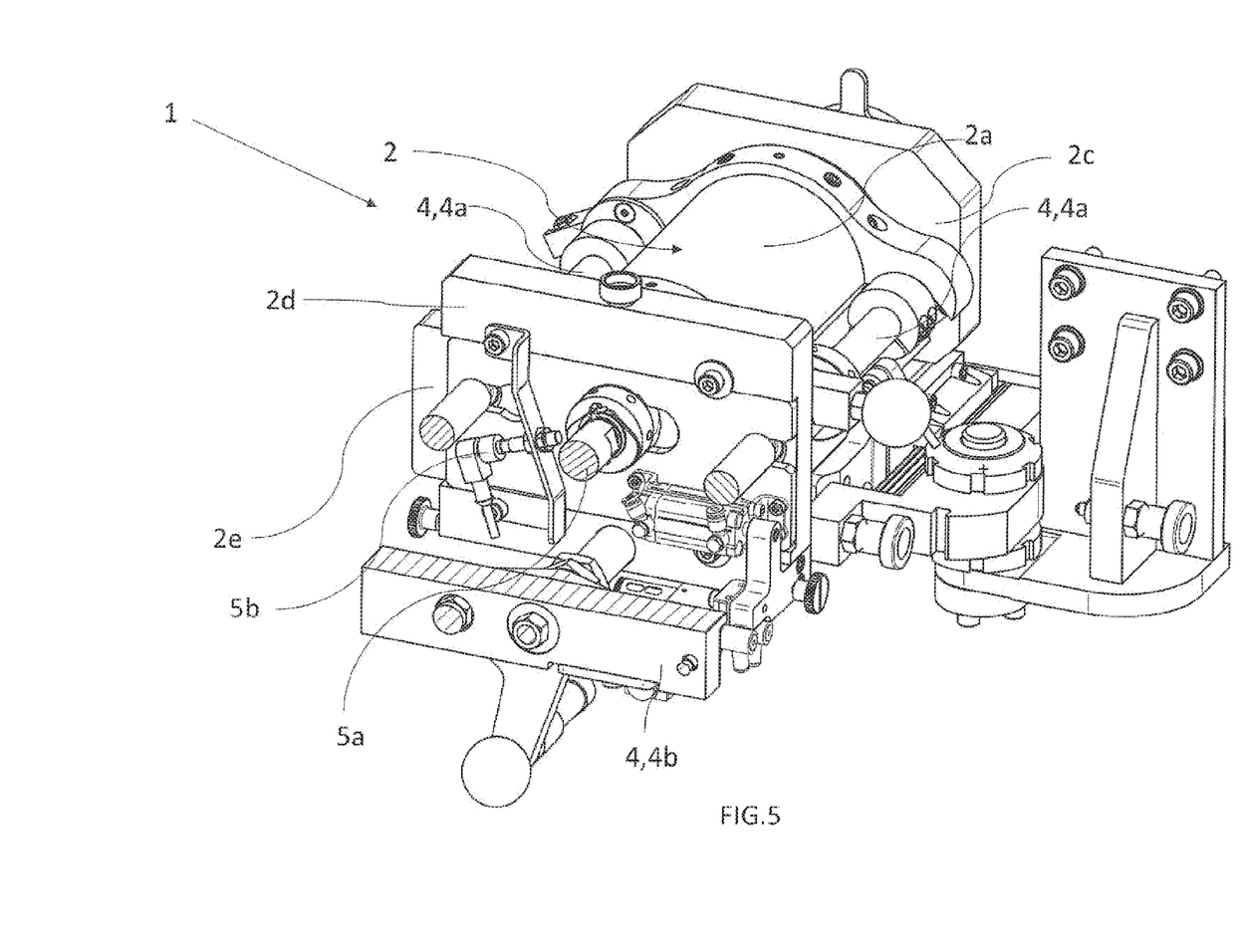
FIG. 5 shows, in an identical illustration to FIG. 4, the feeding apparatus according to FIG. 1 in the case of a closed and locked supporting housing.

Furthermore, the cartridge 3 is provided on its outer circumference with a circumferential driver groove 3e and a likewise circumferential positioning groove 3f, the function of which will be described further below. As is apparent from FIG. 3, the cartridge 3 can be inserted exchangeably into the supporting housing 2 of the feeding device 1 and, in the case of a closed supporting housing 2 (cf. FIGS. 4 and 5), is supported on all sides by the supporting housing 2. Here, the front closure plate 2c of the supporting housing 2 is provided with a passage opening for the squeezing nozzle 3c of the cartridge 3, and the rear closure plate 2d of the supporting housing 2 is provided with a passage opening for a push rod of an axial actuating drive (5) which will be explained further below, which push rod acts on the pressing plunger 3d of the cartridge 3.

Furthermore, the supporting housing 2 is provided with an outer supporting cage 4 which is connected rigidly to the front closure plate 2c of the supporting housing 2 and has two tie rods 4a which run parallel to the longitudinal axis of the supporting housing 2 and for their part are connected rigidly to an abutment frame 4b which is arranged in parallel with and at a spacing from the rear closure plate 2d of the supporting housing 2.

The rear closure plate 2d and the upper half shell 2a of the supporting housing 2 are mounted in an axially displaceable manner on the tie rods 4a of the supporting cage 4, and can be displaced axially in the direction of the front closure plate 2c of the supporting housing 2 with support on the abutment frame 4b. Moreover, the upper half shell 2a of the supporting housing 2 is mounted on one of the tie rods 4a of the supporting cage 4 such that it can be swiveled in such a way that the cylindrical interior space of the supporting housing 2 can be opened and closed for the cartridge exchange by way of the upper half shell 2a being swiveled upward and downward, respectively.

Furthermore, on their end sides and those faces of the closure plates 2c and 2d of the supporting housing 2 which face said end sides, the two half shells 2a and 2b of the supporting housing 2 are provided with tongue/groove connections which engage into one another, which engage axially into one another in the case of the axial displacement of the rear closure plate 2d in the direction of the front closure plate 2c, and in this way fix all the modules of the supporting housing 2 on one another in a non-positive and positively locking manner in the case of a closed supporting housing 2.

An axial actuating drive 5 is fastened to the abutment frame 4b of the supporting cage 4 on the side which faces away from the supporting housing 2, the push rod 5a of which axial actuating drive 5, which push rod 5a can be displaced axially along the longitudinal axis A of the supporting housing 2, acts on the axially displaceable rear closure plate 2d of the supporting housing 2 firstly in the case of the cartridge 3 being pressed onto the pressing plunger 3d of the cartridge 3 and secondly in the case of the modules of the supporting housing 2 being pushed together axially, that is to say in the case of the closing of the supporting housing 2. To this end, a locking plate 2e which serves as a locking apparatus is arranged in the region of the passage opening in the rear closure plate 2d of the supporting housing 2, which locking plate 2e, in its locking position, establishes a tension-resistant and pressure-resistant connection between the push rod 5b of the axial actuating drive 5 and the rear closure plate 2d of the supporting housing 2, and, in its unlocked position, releases the push rod 5a for the actuation of the pressing plunger 3d of the cartridge 3. Furthermore, the axial actuating drive 5 is provided with a distance measuring apparatus 5b which determines and forwards the respective current axial extended position of the push rod 5a.

In order to ensure that the cartridge 3 is inserted in each case in the correct position in the case of the cartridge change, the upper half shell 2a of the supporting housing 2, which upper half shell 2a can be swiveled upward, is provided with a swivel plate 2f which, in the case of an upper half shell 2a which is swiveled upward, engages the positioning groove 3f of the cartridge 3 to be inserted. This ensures that the cartridge 3 is situated axially exactly in that position, at which, in the case of the upper half shell 2a being swiveled downward, a driver projection 2g which is arranged on its inner side engages into the above-described driver groove 3e on the outer circumference of the cartridge 3. At the same time, in the case of the upper half shell 2a being swiveled downward, the swivel plate 2f releases the cartridge 3 for axial movements. As a result of said measures, in the case of the closing and pushing together of the modules of the supporting housing 2, the upper half shell 2a can push the squeezing nozzle 3c of the cartridge 3 in a sealing manner into the passage opening in the front closure plate 2c. Conversely, in the case of opening of the supporting housing 2, the squeezing nozzle 3c of the cartridge 3 is pulled out of said passage opening with the aid of the driver projection 2g.

LIST OF DESIGNATIONS

1 Feeding apparatus
2 Supporting housing
2a Upper half shell
2b Lower half shell
2c Front closure plate
2d Rear closure plate
2e Locking plate
2f Swivel plate
2g Driver projection
3 Cartridge
3a Cartridge cylinder
3b Closure plate
3c Squeezing nozzle
3d Pressing plunger
3e Driver groove
3f Positioning groove
4 Supporting cage
4a Tie rods
4b Abutment frame
5 Axial actuating drive
5a Push rod
5b Distance measuring apparatus

The invention claimed is:

1. A feeding apparatus for feeding a pasty mass to an injection molding machine, comprising:
   a pressing cylinder which receives the pasty mass; and
   a pressing plunger which is arranged axially in said pressing cylinder and presses the pasty mass out of a squeezing nozzle of the pressing cylinder;
   wherein the pressing cylinder is configured as a cartridge which contains the pasty mass;
   wherein the cartridge is produced from a polymer, and can be inserted exchangeably into a supporting housing which supports the cartridge on all sides and is connected to an axial actuating drive for the pressing plunger which is situated in the cartridge;
   wherein the supporting housing is of modular configuration and has an upper half shell and a lower half shell which support the casing of the cartridge and are connected to one another such that they can be folded open laterally and are articulated about a swivel axis which runs parallel to the longitudinal axis of the cartridge, the receiving space for the cartridge, which receiving space is enclosed by the upper half shell and the lower half shell, being delimited axially at a front and at a rear by front and rear closure plates, respectively, and the front closure plate being provided with a passage opening for the squeezing nozzle of the cartridge, whereas the rear closure plate is provided with a passage opening for a push rod of the axial actuating drive, which push rod acts on the pressing plunger of the cartridge;
   wherein the supporting housing has a rigid, outer supporting cage which is formed by the front closure plate, at least two tie rods which run parallel to the longitudinal axis of the supporting housing and are arranged outside the upper half shell and the lower half shell, and an abutment frame which runs parallel to the closure plates and to which the axial actuating drive which displaces the push rod is fastened on a side which faces away from the supporting housing; and
   wherein one half shell selected from the group consisting of the upper half shell and the lower half shell is mounted on one of the at least two tie rods of the supporting cage such that the one half shell can be swiveled in such a way that the receiving space can be opened and closed for cartridge exchange by way of the one half shell being swiveled upward and downward, respectively.

2. The feeding apparatus as claimed in claim 1, wherein the upper half shell and the lower half shell of the supporting housing are provided with tongue/groove connections which engage axially into one another on their end sides and those faces of the closure plates which face said end sides, and wherein the rear closure plate can be displaced axially relative to the supporting cage.

3. The feeding apparatus as claimed in claim 1, wherein, after the insertion of the cartridge into the supporting housing, the push rod of the axial actuating drive can be connected by a locking apparatus first of all only to the rear closure plate of the supporting housing and subsequently only to the pressing plunger of the cartridge.

4. The feeding apparatus according to claim 1, wherein the lower half shell of the supporting housing is fixed in an axially non-displaceable manner on the front closure plate, and wherein the upper half shell of the supporting housing is mounted in an axially displaceable manner on the supporting cage in the case of a closed supporting housing and an inserted cartridge.

5. The feeding apparatus as claimed in claim 1, wherein, on its outer circumference, the cartridge is provided with a circumferential driver groove, into which a driver projection which is arranged on an inner side of the upper half shell engages in the case of closing of the supporting housing.

6. The feeding apparatus as claimed in claim 5, wherein the cartridge is provided with a circumferential positioning groove, into which, in the case of an open supporting housing, a swivel plate which is assigned to the upper half shell engages, which swivel plate already fixes a correct axial position of the cartridge in relation to the upper half shell in the case of the insertion of the cartridge into the open supporting housing.

7. The feeding apparatus as claimed in claim 1, wherein the push rod of the axial actuating drive is assigned a distance measuring apparatus which determines a respective axial position.

* * * * *